(12) United States Patent
Northby

(10) Patent No.: US 7,453,569 B2
(45) Date of Patent: *Nov. 18, 2008

(54) METHOD AND APPARATUS FOR MEASURING PARTICLE MOTION USING SCATTERED RADIATION

(76) Inventor: Jan Arwood Northby, 110 Old North Rd., Kingston, RI (US) 02881-1407

( * ) Notice: Subject to any disclaimer, the term of this patent is extended or adjusted under 35 U.S.C. 154(b) by 296 days.

This patent is subject to a terminal disclaimer.

(21) Appl. No.: 11/356,787

(22) Filed: Feb. 17, 2006

(65) Prior Publication Data

US 2006/0152722 A1  Jul. 13, 2006

Related U.S. Application Data

(63) Continuation-in-part of application No. 10/632,180, filed on Jul. 31, 2003, now Pat. No. 7,012,688.

(60) Provisional application No. 60/399,974, filed on Jul. 31, 2002.

(51) Int. Cl.
G01N 21/00 (2006.01)
G01P 3/36 (2006.01)

(52) U.S. Cl. .................... 356/337; 356/28
(58) Field of Classification Search .......... 356/337–343
See application file for complete search history.

(56) References Cited

U.S. PATENT DOCUMENTS

| 3,762,221 | A | * | 10/1973 | Coulthard ............ 73/861.06 |
|---|---|---|---|---|
| 4,851,697 | A | | 7/1989 | Schodl |
| 4,978,863 | A | | 12/1990 | Lyons et al. |
| 5,343,290 | A | * | 8/1994 | Batchelder et al. .......... 356/484 |
| 5,365,326 | A | | 11/1994 | Chrisman et al. |
| 5,701,172 | A | | 12/1997 | Azzazy |
| 5,856,865 | A | | 1/1999 | Galtier et al. |
| 5,859,694 | A | | 1/1999 | Galtier et al. |
| 6,128,072 | A | | 10/2000 | Kiel et al. |
| 6,275,284 | B1 | | 8/2001 | Kiel et al. |
| 6,323,949 | B1 | | 11/2001 | Lading et al. |

OTHER PUBLICATIONS

Agrawal, et al. "Velocity Observations Above a Rippled Bed Using Laser Doppler Velocimetry" *J. Geophys. Res.*, 1992, 97(C12): 20:249-20,259.
Bertuccioli, et al. "A Submersible Particle Image Velocimetry System for Turbulence Measurements in the Bottom Boundary Layer," *J. Atmos. Oceanic Technol.*, 1999, 16(11): 1635-1646 (abstract only).
Doron, et al. "*Turbulence Characteristics and Dissipation Estimates in the Coastal Ocean Bottom Boundary Layer from PIV Data,*" 1999 (Thesis).
Xia et al., "Dual-beam incoherent cross-correlation spectroscopy," *Opt. Soc. of Am.*, 1995, 12(7): 1571-1578.

* cited by examiner

*Primary Examiner*—Tarifur R Chowdhury
*Assistant Examiner*—Tara S Pajoohi
(74) *Attorney, Agent, or Firm*—K & L Gates LLP

(57) ABSTRACT

A method and apparatus for measuring particle motion using electromagnetic radiation uses beams of radiation modulated with a distinct frequency and/or phase. A particle traversing these beams scatters a portion of the radiation. Scattered radiation, which retains its modulation information, is then detected, and a cross-correlation technique is used to quantify the particle's motion, for example, particle velocity.

38 Claims, 11 Drawing Sheets

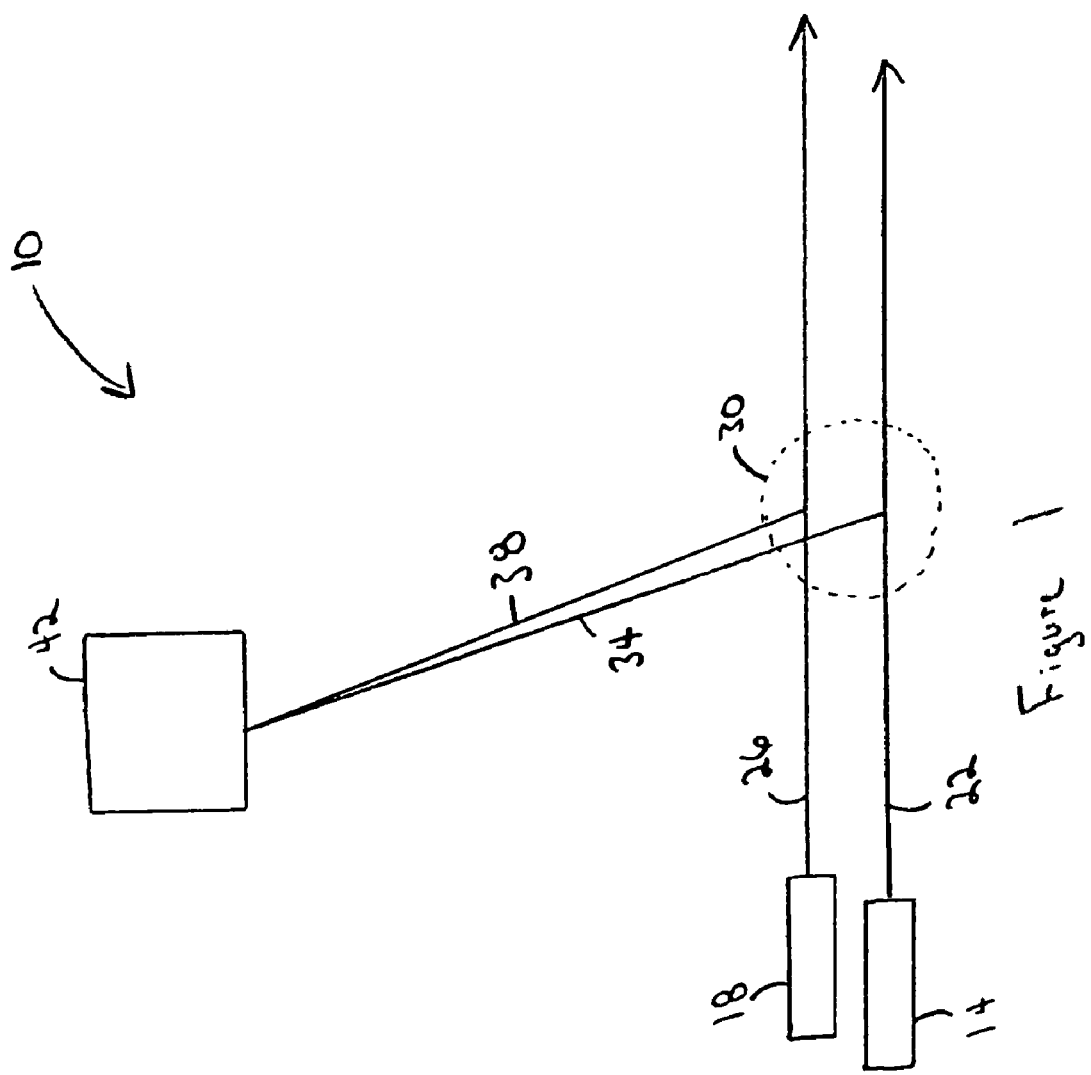

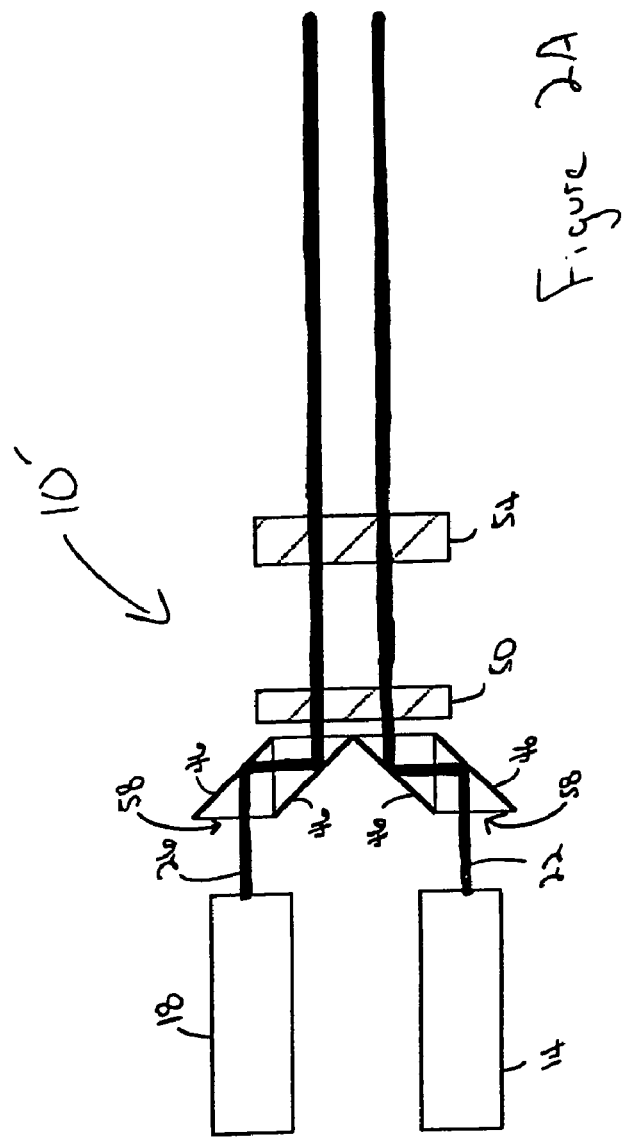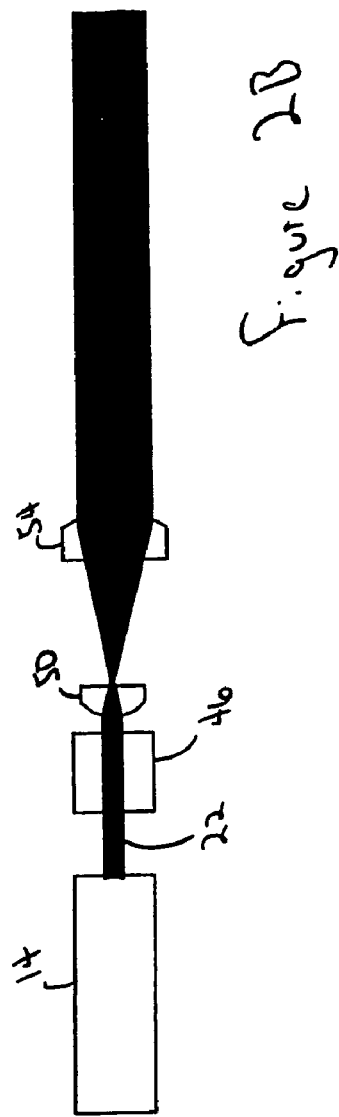
Figure 2A
Figure 2B

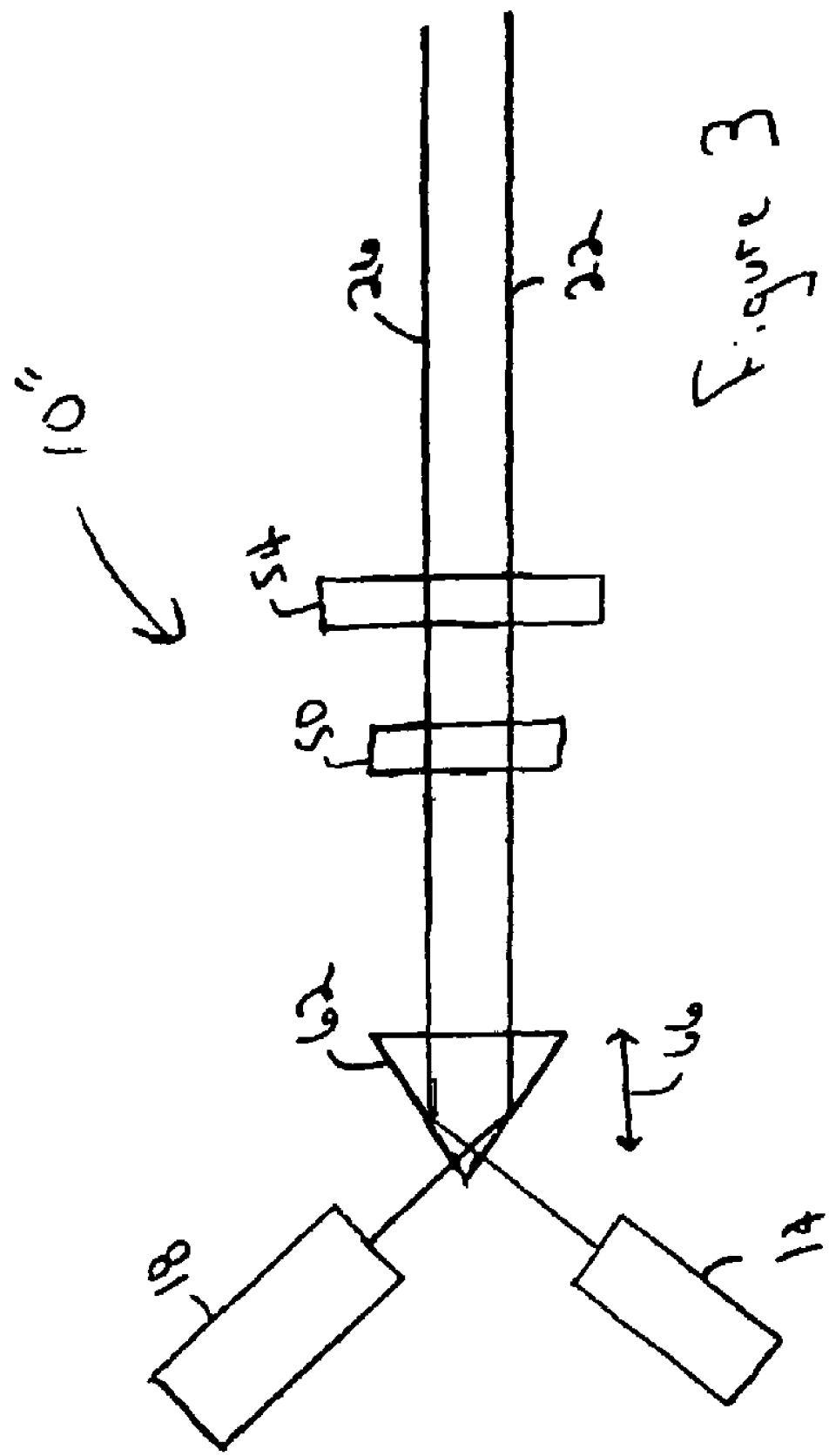

METHOD AND APPARATUS FOR MEASURING PARTICLE MOTION USING SCATTERED RADIATION

CROSS-REFERENCE TO RELATED APPLICATION

This application claims the benefits of and priority to U.S. Provisional Patent Application Ser. No. 60/399,974 filed on Jul. 31, 2002 and to U.S. patent application Ser. No. 10/632,180 filed on Jul. 31, 2003, the disclosures of which are incorporated herein by reference in their entirety.

FIELD OF THE INVENTION

The invention relates generally to the field of methods and apparatus for measuring particle motion, and more particularly to measuring particle motion using scattered light.

BACKGROUND OF THE INVENTION

Quantitative information about a material in a region of space may be obtained remotely by observing how the material scatters radiation projected through that region. The scattering process normally causes the light to be reemitted diffusely in all directions though. Therefore, it is often difficult for a detection system to resolve the scattered light arising from one radiation source from the scattered light arising from another source.

One method that can be used to discriminate between scattering sources is to use radiation sources, for example, lasers, with different wavelengths. Then the scattered radiation can be divided into several beams, each beam falling on one of several detectors, each detector responding to only one wavelength. The primary problems associated with using different wavelengths are that multiple detectors and multiple lasers are used. The laser may have distinct properties, including power, size, emitting area, and/or emission patterns, which complicates calibration of the individual detectors, and compromises accuracy.

A technique for measuring particle velocity is Laser Doppler Velocimetry or Anemometry. Two coherent beams are projected at a small angle with respect to each other, and in the small region where they overlap, interference fringes form parallel to their mean direction. When a particle passes through this region, the amplitude of the scattered signal is modulated with a frequency that is equal to the speed divided by the fringe spacing. It is not possible to infer the velocity component (the speed component normal to the fringe pattern including sign) from this information without precisely shifting the frequency of one beam relative to the other. In this case, the fringe pattern drifts toward one direction, and if the drift is faster than the largest speed in that direction, all the measurements of speed relative to the fringe motion will have the same sign. Adding the fringe velocity to the measured relative velocity produces the normal velocity including the correct sign.

While it is possible to use these instruments in situ with naturally occurring particles, it is not convenient. For example, since one requires coherence of the two beams, a slight change in the optical path associated with window degradation or a discontinuity in the medium can distort the fringe pattern. Furthermore, the naturally available particle distribution may not be suitable, for example, too many particles or the wrong size particle. Finally, since coherent beams require high quality lasers, the devices are relatively expensive.

SUMMARY OF THE INVENTION

The present invention, in one embodiment, provides a method and apparatus for measuring particle motion using electromagnetic radiation. Beams of radiation are modulated with a distinct frequency and/or phase, and a particle traversing these beams scatters a portion of the radiation. Scattered radiation, which retains its modulation information, is then detected, and a cross-correlation technique is used to quantify the particle's motion, for example, particle velocity.

The invention uses adjacent spatial regions that are not optically resolved and, indeed, can even intersect. The invention utilizes all identical and inexpensive light sources, involves only a single detector, and is straightforward to generalize to higher dimensions. It does not involve coherent light and therefore is less susceptible to window degradation and isotropic scattering in the medium. The invention also shifts the complexity from relatively expensive optics, to relatively inexpensive electronics. The invention has the further advantage that under many situations, it can simultaneously provide detailed information about the particle size distribution, as well the particle velocity distribution, in a flow.

As used herein, the term "transparent medium" refers to a medium in which radiation can propagate a significant distance without being significantly absorbed or scattered by the medium. Such a medium is intended to include a vacuum through which a particle may move.

As used herein, the term "scatter" refers to all mechanisms by which radiation, incident from one direction, is re-emitted in a direction distinct from the first direction, with either the same or possibly a different wavelength. This includes, but is not limited to, reflection, refraction, diffraction, and fluorescence.

As used herein, the term "particle" refers to all non-uniformities that scatter radiation in a transparent medium. Particles may include, but are not limited to, sediment, bubbles, seed particles, density discontinuities, or any other material that locally scatters radiation. Particles are intended to include imperfections on a surface as well.

In one aspect, the present invention provides an apparatus for measuring particle motion. The apparatus includes a plurality of beams of radiation, each of the plurality of beams modulated at a respective, pre-determined frequency and a respective, pre-determined phase. The plurality of beams of radiation are directed to at least one particle. A detector is positioned to receive radiation scattered from each of the plurality of beams by the at least one particle. A processor is in electrical communication with the detector, and the processor cross-correlates radiation scattered from at least two of the plurality of beams by the at least one particle. The apparatus, in one embodiment, includes a phase sensitive detection circuit in electrical communication with the detector. In one embodiment, the radiation scattered includes a random component and a modulation frequency. The random component has characteristic frequencies lower than the modulation frequency of any of the plurality of beams.

In various embodiments, the plurality of beams of radiation form planes of radiation. In one embodiment, the plurality of beams of radiation includes two orthogonal beam pairs. In an alternative embodiment, the plurality of beams of radiation includes three orthogonal beam pairs. In another embodiment, the plurality of beams of radiation includes a plurality of non-orthogonal beam pairs.

In one embodiment, the separation of at least two of the plurality of beams of radiation is determined by the distance over which the velocity of the particle is substantially unchanged. The separation may be between about 1 mm and about 1 cm. In one embodiment, a laser diode produces the plurality of beams of radiation. The wavelength, in one embodiment, is about 650 nm. In one embodiment, at least one of the plurality of beams of radiation is square wave modulated. In various embodiments, the modulation frequency is between about 20 kHz and 100 MHz, and is preferably between about 40 kHz and 100 kHz or between about 400 kHz and 800 kHz. In one embodiment, the modulation frequency of one of the plurality of beams is different than the modulation frequency of another of the plurality of beams. In various embodiments, the processor calculates particle velocity and/or particle size. In various embodiments, the pre-determined frequency of a first beam of the plurality of beams of radiation is substantially similar to the pre-determined frequency of a second beam of the plurality of beams of radiation, and the pre-determined phase of the first beam of the plurality of beams of radiation is substantially orthogonal to the pre-determined phase of the second beam of the plurality of beams of radiation.

In general, in yet another aspect the invention relates to methods and apparatus that allows for the extraction of a plurality of separate channels of information from scattered light arising from different beams that are sufficiently proximal to each other, that one cannot separate them by optical means alone. These methods and apparatus include steps and devices for modulating each beam with a separate frequency and phase, projecting all beams on a sample region, detecting all scattered light from that region with a single detector, as a single signal, and then separating out the radiation scattered from each different incident beam into separate electrical channels. This is accomplished by phase sensitive detection at the frequency and phase of each particular light source and integrating or filtering the signal in each channel. In general, a wide range of frequencies can be used, but if the chosen frequencies result in a low beat frequency, integration must be carried out long enough to remove the beat frequency before the channels become sensitive to only one light source. A 4:2:1 frequency ratio is beneficial in some embodiments since these and their beat frequencies are removed by integrating over any sub-multiple of the "1-frequency."

In another aspect, the present invention provides a method of measuring motion of a particle. The method includes directing radiation from a plurality of beams to at least one particle, each of the plurality of beams modulated at a respective, pre-determined frequency and a respective, pre-determined phase. Radiation scattered by the at least one particle from at least two different beams is detected and cross-correlated to measure the motion of a particle. In various embodiments, the particle is located in a fluid. In one embodiment, the particle's velocity corresponds to velocity of the fluid.

In another aspect, the techniques and devices disclosed herein can be adapted to measure the relative motion of particles using a moving beam pattern. A beam pattern can include two or more beams. In one relative motion based embodiment, a beam pattern is moved over a region of space where the scattering particles are also moving. In such an example, a position dependent measurement of the velocity of particles contained in the region of space can be obtained.

In one embodiment, the beam modulation can be set at very high frequency so that the modulation and beat frequencies can be removed while still leaving a wide scattered signal bandwidth. As a result, velocity measurements can be made in a short period of time, as long as the particle density is high enough so that one or more particles will cross both beams during that period.

In another aspect, it is possible to move the beam pattern, using mirrors or other suitable mechanisms, from one point to another and obtain stationary beam measurements at several points in a short period of time. This allows for the measurement of both the velocity and various velocity derivatives. In one relative motion based detection apparatus, it is possible to raster a beam pattern and measure relative velocity over a region of space. The properties of particles at rest can also be measured using this method.

The methods and apparatus described herein can also be used to obtain a measure of the time-of-flight (TOF) distribution. In some embodiments, a size dependent (or other property dependent) TOF distribution exists. Thus, by measuring a TOF distribution in combination with some parameters associated with what caused it, a particle size distribution can be ascertained. For example, in the rapidly accelerated flow in a nozzle expansion in a gas, the particles are not able to accelerate completely with the gas. As the result, a TOF distribution measuring the particles' aerodynamic sizes can be obtained. The relative motion based approaches described herein can be used to characterize the TOF distribution in such embodiments. In another embodiment, a charge state can be induced on a set of particles. If the particles are allowed to reach a terminal velocity in an electric field, particle size information can be determined.

Additionally, a given TOF distribution can be used to measure particle properties other than particle size. As an example, since some particles contain a molecular complex that is easily ionized by a particular wavelength, wherein other particles lack the relevant complex, this difference can be used to count the relevant particles. Thus, if a sample of particles is subjected to an ionizing light field and an electric field, then the ionized particles will have a short TOF, while the un-ionized particles may move slowly or remain stationary. In fact, if the particles are otherwise similar, it is possible that the TOF distribution will serve as a measure of the number of easily ionized complexes that are attached to it. In this case the "property" is the number of complexes on a particle, and the TOF distribution is induced such that it becomes a measure of that number of complexes.

In addition to TOF distribution focused embodiments, other parameters of interest can be evaluated using the techniques and devices disclosed herein. For example, the techniques and devices disclosed herein can be used to evaluate particles that contain, or that can be made to contain, a particular fluorophore that is excited by an incident wavelength generated by an aspect of the invention. As a result, if a given measurement apparatus is adapted to only detect a signal at a specific fluorescent emission wavelength, then the measurement device will only be sensitive to that species of particle. Thus, the number of particles containing a particular type of fluorescence in a sample can be obtained by shining a light with the corresponding fluorescent emission wavelength.

As an example, if the objective is to count the number of particles in a sample, such as blood, and if it is a further objective to know the number of cells of a particular type, such as white blood cells, a fluorescent based approach can be used. Specifically, if the white blood cells only fluoresce at a particular wavelength (or one can selectively attach a molecule that does so) and the other cells do not fluoresce at the chosen wavelength, the methods and apparatus disclosed herein can be tailored to only respond to those particles. This allows one class of cells to be counted independent of the other cell types.

In one embodiment, the invention relates to the use of a segmented detector to detect scattered radiation. A segmented detector is a detector that operates such that light emitted from different regions in space can be imaged onto different segments of the detector. Thus, a set of adjacent thin detector strips that can receive directed light represent one form of segmented detector. Other segmented detectors include one or more segmented photodiodes, avalanche photodiodes, multi-anode photomultiplier tubes, CCD devices, and combinations thereof. Segmented detectors can be used with the methods and apparatus disclosed herein whenever different physical regions in space need to be delineated optically. This follows because in order to achieve an optimized measurement from some of the methods described herein, it is possible to make simultaneous measurements at different regions of space through which the beam pattern passes.

The various aspects, embodiments, methods and apparatus disclosed herein can be used in a variety of fields and disciplines wherein monitoring particles or other small objects is of interest. Suitable fields and disciplines include, but are not limited to cytology, environmental and hazardous waste monitoring, construction, aerodynamics, combustion based technologies, aerosol technologies, calibration applications, fluid mechanics, clean room applications, HVAC applications, biological applications, chemical applications, particle counting, pharmaceutical development, turbulence application, particle detection, particle sizing, and medical device and system testing.

Other aspects and advantages of the invention will become apparent from the following drawings, detailed description, and claims, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. In the drawings, like reference characters generally refer to the same parts throughout the different views. The drawings are not necessarily to scale, emphasis instead generally being placed upon illustrating the principles of the invention.

FIG. 1 is a schematic illustration of an embodiment of an apparatus for measuring particle motion according to the invention;

FIG. 2A is a top view of an exemplary embodiment of optics for shaping the beams of radiation of an apparatus for measuring particle motion according to the invention;

FIG. 2B is a side view of the embodiment of the apparatus for measuring particle motion shown in FIG. 2A;

FIG. 3 is a top view of another exemplary embodiment of optics for shaping the beams of radiation of an apparatus for measuring particle motion according to the invention;

DESCRIPTION OF THE ILLUSTRATIVE EMBODIMENTS

Figure 4:
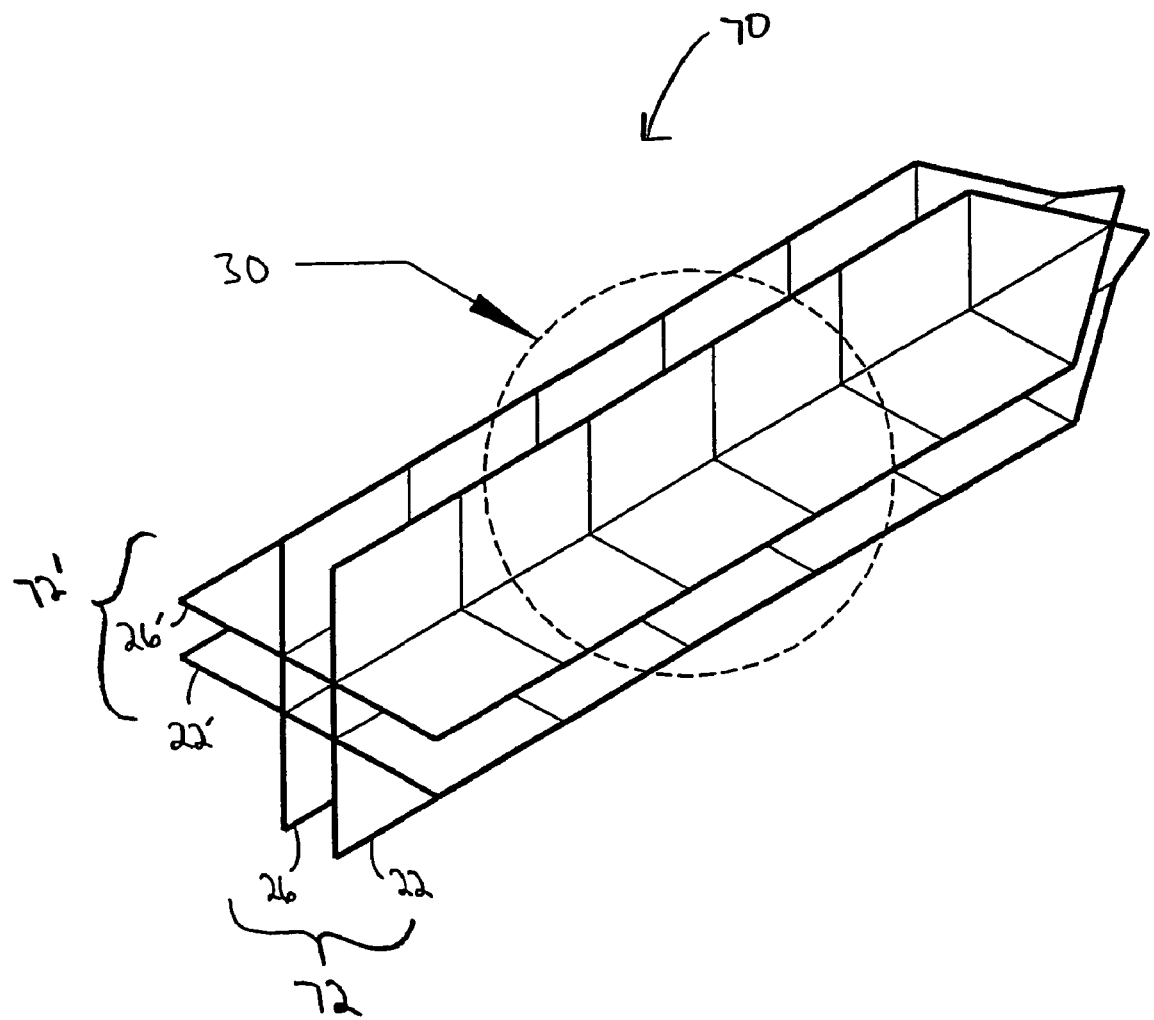
FIG. 4 is a perspective view of an illustrative embodiment of two orthogonal beam pairs of an apparatus for measuring particle motion according to the invention.

FIG. 1 depicts an embodiment of an apparatus 10 for measuring particle motion. The apparatus 10, in use, includes a first source of radiation 14, a second source of radiation 18, a first beam of radiation 22 generated by the first source of radiation 14, a second beam of radiation 26 generated by the second source of radiation 18, an observation region 30 in which particles scatter radiation, a first beam of scattered radiation 34, a second beam of scattered radiation 38, and a detector 42. The two sources 14 and 18 project the two beams of radiation 22 and 26, respectively, in a first direction through a transparent medium. The two beams 22 and 26 are intersected by a particle (not shown) traveling in a second direction. As the particle crosses the first beam of radiation 22 in the observation region 30, it scatters radiation and forms the first beam of scattered radiation 34, which is received by the detector 42. As the particle crosses the second beam of radiation 26 in the observation region 30, it scatters radiation and forms the second beam of scattered radiation 38, which is received by the detector 42. The observation region 30 is defined by the beams of radiation 22 and 26 and the field of the detector 42, which will be described in more detail below.

The sources of radiation 14 and 18 may be coherent or incoherent. The sources of radiation 14 and 18 may be, for example, laser diodes, light emitting diodes, or sources that generate non-optical electromagnetic radiation, such as microwaves. In one embodiment, the radiation is not electromagnetic, but is, for example, acoustic. Acoustic waves propagate further in most transparent media and are most sensitive to scattering by larger particles, but because their characteristic wavelengths are much longer than, for example, optical wavelengths, acoustic waves are inherently of lower resolution. Electromagnetic radiation typically is less penetrating and produces a more local probe of the motion of a particle. Electromagnetic radiation resolution can be much greater than acoustic waves, however, and because of the shorter wavelength of the electromagnetic waves, smaller particles scatter them more efficiently. Electromagnetic radiation is also preferred when there are no naturally occurring particles large enough to scatter acoustic waves.

In one embodiment of the apparatus 10, the sources of radiation 14 and 18 are laser diodes with a wavelength of about 650 nm and a power of about 12 mW. In this embodiment, the apparatus 10 is adjusted so that the observation region 30 is at a distance of between about 30 cm and about 2 m from the sources 14 and 18. The beams of radiation 22 and 26 may be parallel or substantially parallel.

To make quantitative measurements, such as particle velocity or particle size, each beam of radiation 22 and 26 is modulated with a pre-determined frequency and a pre-determined phase. The sources of radiation 14 and 18 may be internally modulated using, for example, an electronic circuit or computer software, or the beams of radiation 22 and 26 may be externally, mechanically modulated using, for example, a mechanical chopper or acousto-optic modulator.

As described above, the response of the particle to the beams of radiation 22 and 26 is to scatter a time-dependent fraction, $f_K(t)$ of the incident radiation, where K represents an individual beam of radiation, such as 22 or 26. Because each beam of radiation 22 and 26 is amplitude modulated by a unique high-frequency function of time, $\phi_K(t)$, the scattered radiation 34 and 38 is then modulated with the same function $\phi_K(t)$ as its respective "source" beam of radiation 22 and 26. Since the individual beams of radiation 22 and 26 are necessarily incoherent, the total scattered signal from the active region 30 is the sum of the scattering intensities arising from the individual beams 22 and 26. The intensity of the signal on the detector 42 coming from the light scattered from the observation region 30 is:

$$I(t) = \sum_K f_K(t)\phi_K(t) \tag{1}$$

Because the frequency of the modulation and the phase of the modulation are known, phase sensitive detection or "lock-in" detection, which will be described in more detail below, may be used to extract the various $f_K(t)$ that are superimposed on the detector 42.

The beams of radiation 22 and 26 may be sinusoidal wave modulated or square wave modulated. The frequency of the modulation may be between about 20 kHz and about 100 MHz, although a lower or higher modulation frequency may be desirable depending on the application. In one embodiment, the modulation frequency is between about 40 kHz and about 100 kHz. In another embodiment, the modulation frequency is between about 400 and about 800 kHz.

In various embodiments, the beams of radiation 22 and 26 are produced by a single source. In one such embodiment, the frequency of modulation is the same for the two beams of radiation 22 and 26, but the two beams of radiation 22 and 26 may have different phases. Preferably, the phases of the two beams 22 and 26 are orthogonal, or $\pi/2$ out-of-phase.

The velocity component, $V_X$ of the particle normal to the two beams of radiation 22 and 26 is:

$$V_X = d/\Delta t, \tag{2}$$

where d is the separation between the two beams of radiation 22 and 26, and $\Delta t$ is the time that the particle takes to travel between the two beams of radiation 22 and 26. Typical separation between the beams of radiation 22 and 26 is between about 1 mm and about 1 cm, although a smaller or larger separation may be desirable depending on the application. The separation of the two beams 22 and 26 may be determined by the correlation distance of a particle, or that distance over which the particle's velocity is substantially unchanged. At a separation beyond the correlation distance, a meaningful $V_x$ can no longer be derived.

Many particles of varying sizes pass through the observation region 30 during a measurement. Since their sizes, concentration, and arrival times are random, their signals are as well. Since most particles that cross the first beam of radiation 22 cross the second beam of radiation 26 at a time $\Delta t = d/V_X$ later, the signal scattered by the first beam at time t, $f_1(t)$, is similar to the signal scattered by the second beam, $f_2(t)$, at a time $\Delta t$ later. Therefore, the two scattered signals are strongly correlated.

The mathematical method that can be used to extract $\Delta t$ is cross-correlation. One calculates the integral:

$$H(\tau) = \int_{-\infty}^{\infty} f_1^*(t) f_2(t+\tau) dt \tag{3}$$

where, if $f_2(t)$ is partially comprised of pulses which are delayed relative to those in $f_1(t)$ by an amount $\Delta t$, the function $H(\tau)$ will have a maximum when $\tau = \Delta t$. Therefore, knowledge of the separation of the beams, d, together with the cross-correlation function maximum, $\Delta t$, permits one to calculate the velocity component $V_X$ normal to the beams of radiation 22 and 26. The cross-correlation function $H(\tau)$ may be calculated numerically if the functions are known in digital form over some time period that is long in comparison to $\Delta t$, which may be either positive or negative. Therefore, the measurement directly provides the velocity including the correct sign, which corresponds to the direction the particle is traveling and is used to interpret measurements made in more than one dimension.

If the velocity is not constant over the period for which the correlation function is computed, $\Delta t$ corresponds to an average value of the time delay over that period. If the velocity is variable on the time scale of $\Delta t$, it is advantageous to decrease the beam separation, which decreases $\Delta t$ as well. The resolution of the experiment also decreases, though, so there is a trade-off between the resolution and the response time. Particle size often may be directly extracted from the intensity of the demodulated scattered signal pulses. Using cross-correlation to determine the velocity permits one to calculate the number of particles of a particular size per unit volume.

FIGS. 2A and 2B show an exemplary embodiment of an apparatus 10' for measuring particle motion, including optics for shaping the beams of radiation 22 and 26. The radiation sources 14 and 18 may include lenses, apertures, and other optics to align the beams of radiation 22 and 26, for example to produce two substantially parallel light beams. According to the embodiment illustrated in FIG. 2A, four prisms 46 bring the beams 22 and 26 close to and nearly parallel to each other, while a first cylindrical lens 50 and a second cylindrical lens 54 form the two beams of radiation 22 and 26 into planes of radiation, for example, ribbons or sheets, by expanding the beams 22 and 26 in one plane. FIG. 2B depicts a side view of the apparatus 10', thus only the first beam of radiation 22 is shown as a plane. The combination of the four prisms 46 and the two cylindrical lenses 50 and 54 control the spacing between the two beams 22 and 26.

In one embodiment, the four prisms 46 are right angle prisms. The prisms 46 may be oriented slightly non-perpendicular to the incoming beams 22 and 26, so that light reflected from the first surfaces 58 does not reflect directly back into the sources of radiation 14 and 18. The prisms 46 may include a reflective coating on the hypotenuse face. The two beams of radiation 22 and 26 are converted into planes of radiation by passing them through the two cylindrical lenses 50 and 54, which are separated by the sum of their focal lengths. A typical focal length for the first cylindrical lens 50 is between about 0.5 cm and about 1 cm. A typical focal length for the second cylindrical lens 54 is between about 1 cm and about 5 cm. By careful orientation of the axes of the sources 14 and 18 and adjustment of the cylindrical lenses 50 and 54, the beams of radiation 22 and 26 are preferably shaped to a vertical height of about 8 mm and a thickness of about 0.1 mm.

FIG. 3 shows another exemplary embodiment of an apparatus 10", where the four prisms 46 are replaced by a single equilateral prism 62. The beams enter and exit the prism substantially normal to its faces, and are deflected by total internal reflection. By translating the prism 62 along an axis parallel to the beams of radiation 22 and 26 (see arrow 66), the separation of the two beams may be adjusted. The cylindrical lenses 50 and 54 convert the beams of radiation 22 and 26 into planes of radiation.

The apparatus 10, 10', and 10" shown in FIGS. 1-3 ideally measure velocity in a single dimension by use of a single beam pair, for example, the two beams of radiation 22 and 26. Generalization to either two- or three-dimensions may be performed by projecting additional beam pairs through the active region 30. FIG. 4 depicts an illustrative embodiment of two beam pairs 70 capable of making a measurement in two-dimensions. The first beam pair 72 including the two beams of radiation 22 and 26 is intersected by a second beam pair 72' including a third beam of radiation 22' and a fourth beam of radiation 26'. According to the illustrative embodiment, the two beam pairs are orthogonal, although they need not be. Each beam 22, 22', 26, and 26' is "labeled" with a unique frequency and phase, and the two velocity components, $V_X$, $V_Y$ normal to each beam pair are derived using the method described above. Because the values of $V_X$ and $V_Y$ including the sign are derived, the velocity in two or more dimensions may be unambiguously determined.

Figure 5:
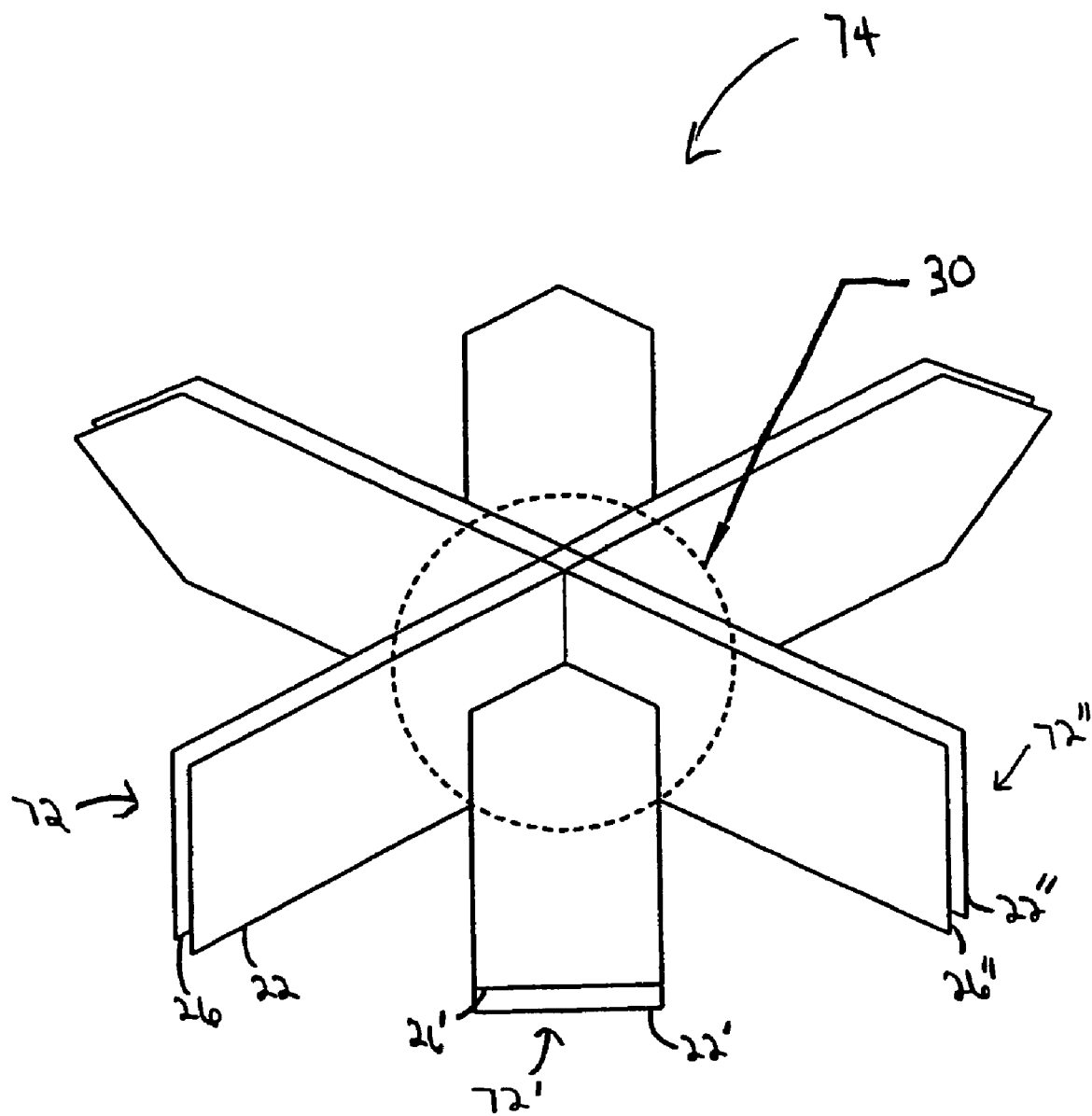
FIG. 5 is a perspective view of an illustrative embodiment of three orthogonal beam pairs of an apparatus for measuring particle motion according to the invention.

FIG. 5 shows an illustrative embodiment of three beam pairs 74 capable of making a measurement in three-dimensions. The first beam pair 72 including the two beams of radiation 22 and 26 and the second beam pair 72' including the two beams of radiation 22' and 26' are intersected in the active region 30 by a third beam pair 72" including a fifth beam of radiation 22" and a sixth beam of radiation 26". According to the illustrative embodiment, the three beam pairs are orthogonal, although they need not be. As described above, each beam of radiation 22, 22', 22", 26, 26', and 26" is "labeled" with a unique frequency and phase, and the three velocity components, $V_X$, $V_Y$, $V_Z$ normal to each beam pair can be derived.

Figure 6:
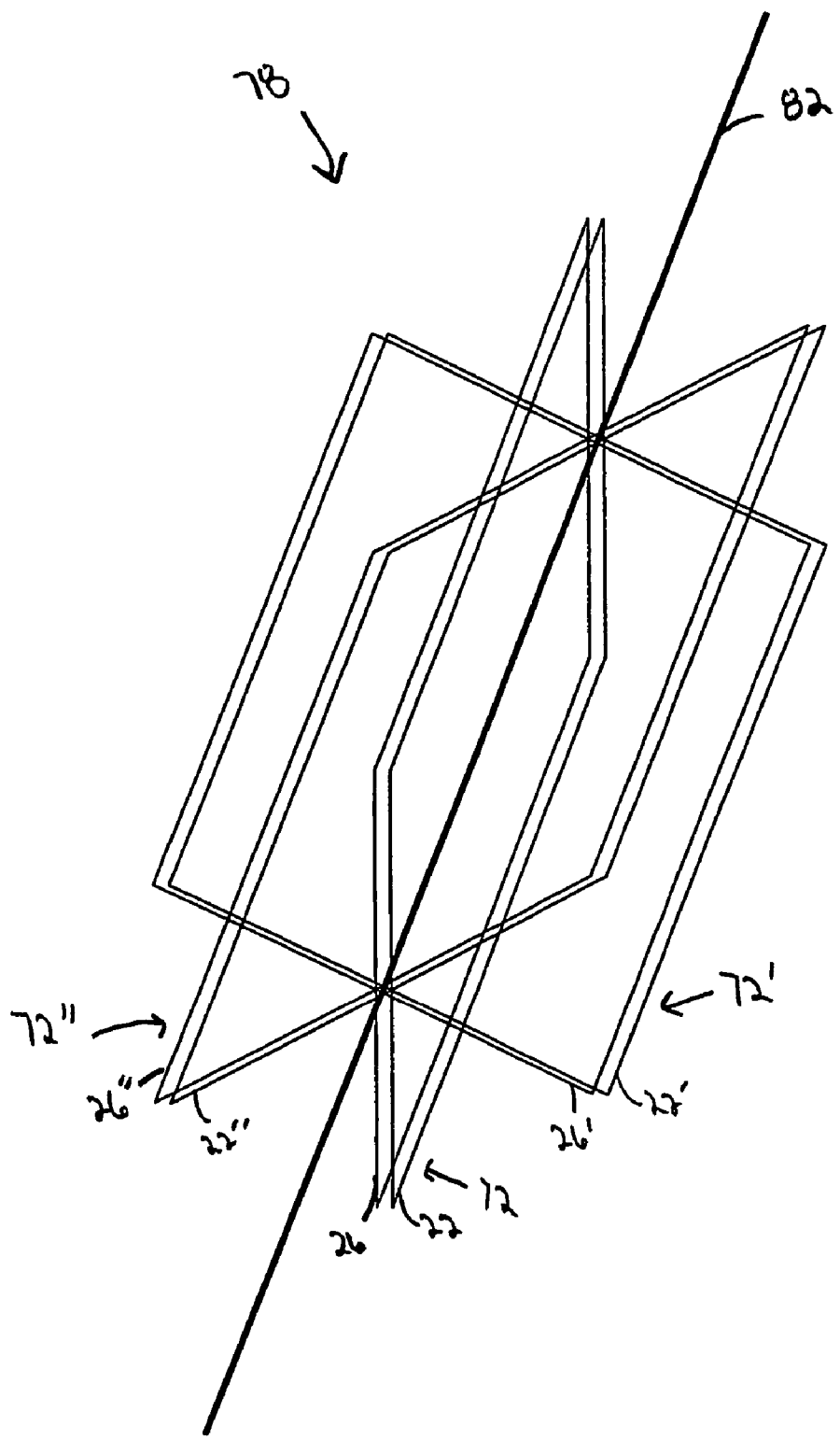
FIG. 6 is a perspective view of an illustrative embodiment of three non-orthogonal beam pairs of an apparatus for measuring particle motion according to the invention.

If a particle traverses a beam pair with a small angle with respect to the plane of a given beam pair and the beam pair spacing is significant, the particle may cross one beam, but not cross the adjacent beam. FIG. 6 depicts an illustrative embodiment of three beam pairs 78, with non-orthogonal orientation for making a measurement in two-dimensions. This embodiment achieves higher directional resolution perpendicular to the beam axis 82 by using only the two beam pairs that give the smallest Δt (or the best defined cross-correlation peaks) to define the velocity component $V_X$, $V_Y$. For example, if a particle enters the three beam pairs 78, substantially in plane with the first beam pair 72, then the particle may not cross one of the beams of radiation 22 and 26. The particle will cross both beams of the second beam pair 72' and the third beam pair 72", making a measurement of the particle motion possible. Alternatively, if the particle enters the first beam pair 72 at a very small angle with respect to the plane of the first beam pair 72, the particle may cross a first beam of radiation 22, cross the second beam pair 72', cross the third beam pair 72", and then finally cross the second beam of radiation 26. In this instance, the signals from the second and third beam pairs 72' and 72" are used to calculate particle motion, and the signal from the first beam pair 72 is disregarded.

Referring back to FIG. 1, a suitable detector 42 may be, but is not limited to, a photomultiplier tube (PMT) or a photo diode, such as an avalanche photo diode. In an alternative embodiment, a series of detectors 42 may be used to detect the radiation scattered 34 and 38 by the particle. The detector 42 may also include a set of optics for directing the radiation scattered 34 and 38 onto the detector 42.

Figure 7:
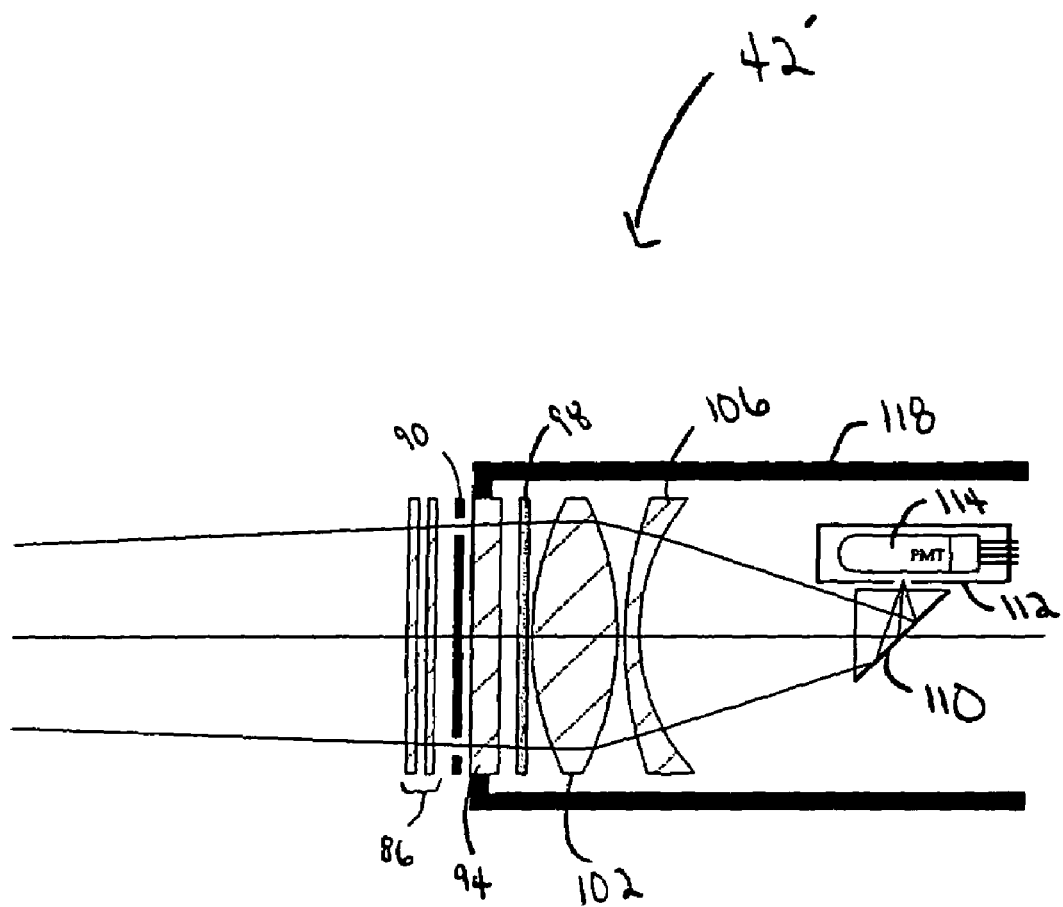
FIG. 7 is a plan view of an exemplary embodiment of collection optics for an apparatus for measuring particle motion according to the invention.

FIG. 7 shows an embodiment of a detector 42' including a pair of colored glass filters 86, an "inverse" iris 90, a window 94, an interference filter 98, a doublet lens 102, a meniscus lens 106, a right angle prism 110, an aperture 112, a PMT 114, and a housing 118. While in the transparent medium, the scattered radiation 34, 38 passes through the pair of colored glass filters 86, which perform an initial narrow band selection. The bandwidth of the colored glass filter pair 86 is between about 50 nm and about 200 nm. The "inverse" iris 90, which is in the form of a narrow annular region, reduces the amount of radiation transmitted to the PMT 114 by restricting the radiation to only the edge regions of the housing 118. The "inverse" iris 94 also reduces the depth of field, rather than increase it like a conventional iris.

The scattered radiation 34, 38 next passes through the window 94 and enters the housing 118. The narrowband, for example about 10 nm, interference filter 98 passes the laser wavelength, but eliminates almost all of the ambient light that may otherwise saturate the detector. Remaining background light is typically not modulated, and therefore does not contribute to any of the scattered radiation 34, 38 signals. It does however reduce the dynamic range of the detector available for true signals and adds to the random detector noise. The doublet lens 102 and the meniscus lens 106 focus the scattered radiation 34, 38 onto a small, circular aperture 112 that, together with the beam geometry, defines the boundaries of the observed scattering region 30. Typical aperture 112 size is between about 1 mm and about 5 mm, and preferably the aperture 112 size is between about 2 mm and about 3 mm. For example, an aperture 112 of about 2 mm diameter at the lens focal plane corresponds to an observed region 30 of about 1 cm diameter, when the lens magnification is 0.2. Scattered radiation 34, 38 reflected by the right angle prism 110 and passing through the aperture 112 is incident on the PMT 114, which produces an electrical signal that is subsequently processed to extract the velocity component(s).

As described above, the scattered light intensity signals from each source K, $f_K(t)$, multiplied by the corresponding modulation functions $\phi_K(t)$, are collectively incident on the detector, which produces an electrical output proportional to their sum. To extract these functions $f_K(t)$ separately from the detector output, the detector signal is passed through a phase sensitive detection circuit. In one embodiment, the circuit is a multi-channel device that has a separate channel for scattered radiation corresponding to each source, K. Alternatively, the circuit includes a separate phase sensitive detector (PSD) for each beam of scattered radiation corresponding to each beam of radiation.

In either embodiment, the output of each PSD channel, after filtering to remove the modulation and beat frequencies, is proportional to the scattered signal associated with a single source K. The resulting signals from these K channels are now cross-correlated in pairs, and from these correlations the velocity components may be calculated.

Figure 8:
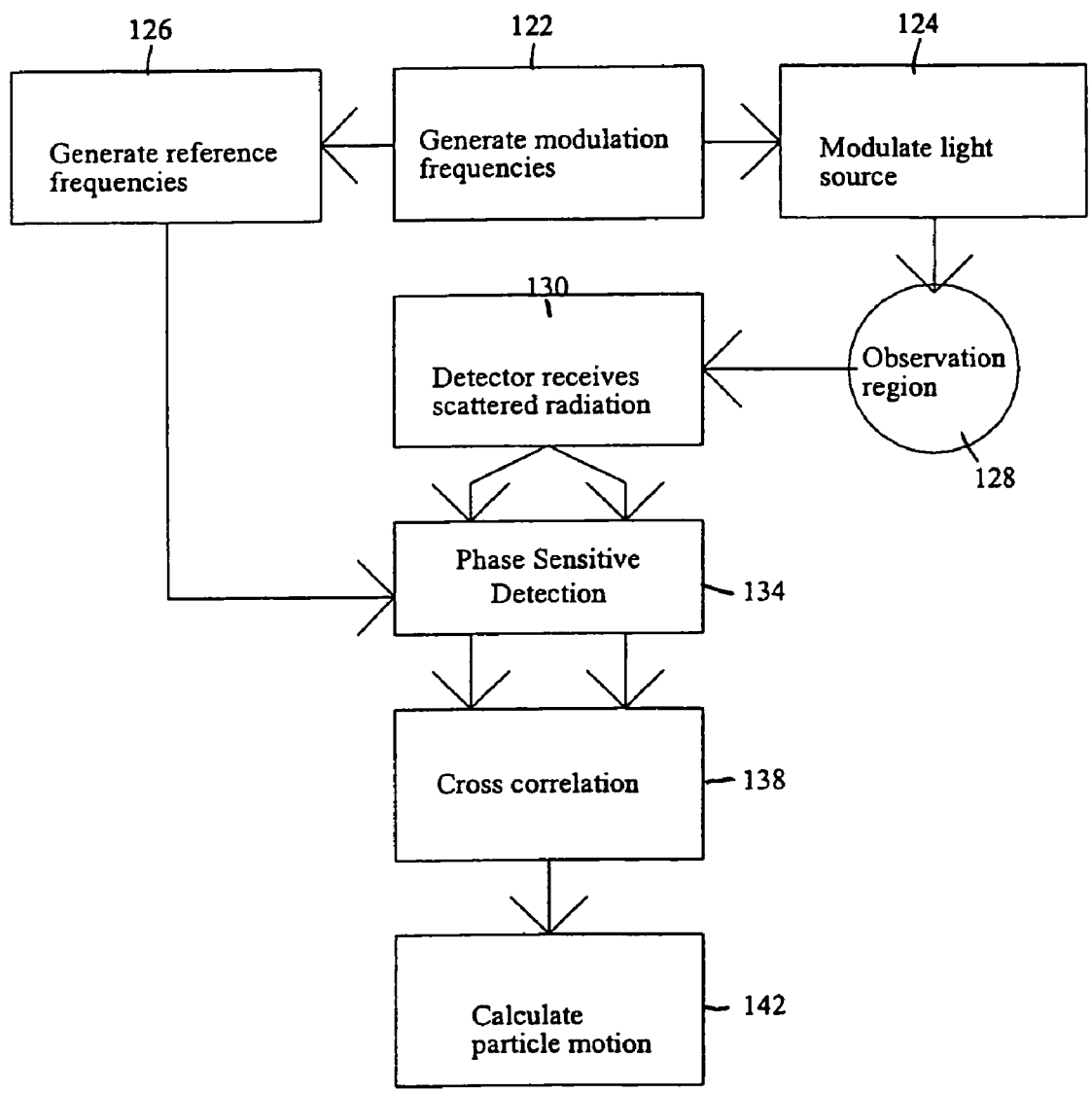
FIG. 8 is a schematic illustration of a flow diagram showing the modulation, demodulation, and cross-correlating sequence, according to the invention.

FIG. 8 depicts an exemplary embodiment of a flow diagram for modulating the beams of radiation 22 and 26 and demodulating and cross-correlating the scattered radiation 34 and 38 to extract quantitative information regarding particle motion. The flow diagram is for a single beam pair for measuring one velocity component, although the modulation/demodulation may be extended to two or three dimensions by modulating/demodulating additional beams of radiation in a similar fashion. The steps need not be performed in the order described to successfully measure particle motion. The work flow described below may be realized with, for example, an electronic circuit or computer software.

According to the illustrative embodiment, a modulation frequency is generated (step 122) and directed to drivers for the sources of radiation (step 124). A time-delayed reference frequency is also generated (step 126). The modulation frequency and the reference frequency have the same frequency, but the phase of the reference frequency is shifted to compensate for the delay for the scattered radiation to reach the detector and to compensate for the rise time of the detector and/or a preamplifier. In addition, in an embodiment utilizing a plurality of laser diodes, the reference frequency for each laser diode may be shifted independently to account for variations in the rise time of each laser diode.

Modulated radiation is scattered by a particle traversing the beams of radiation in the observation region (step 128), and the scattered radiation is collected by the detector (step 130). The signal from the detector may be treated with a preamplifier. The reference frequency is directed to a set of PSD's, which extract a signal for each source of scattered radiation (step 134). The output from the PSD's may be filtered by a low-pass filter and/or notch filters to remove low frequency components of the signal. The scattered radiation, each scattered beam originating from the particle crossing the individual beams of radiation, is then cross-correlated (step 138), and a calculation of, for example, particle velocity or particle size is performed using a processor (step 142).

Figure 9:
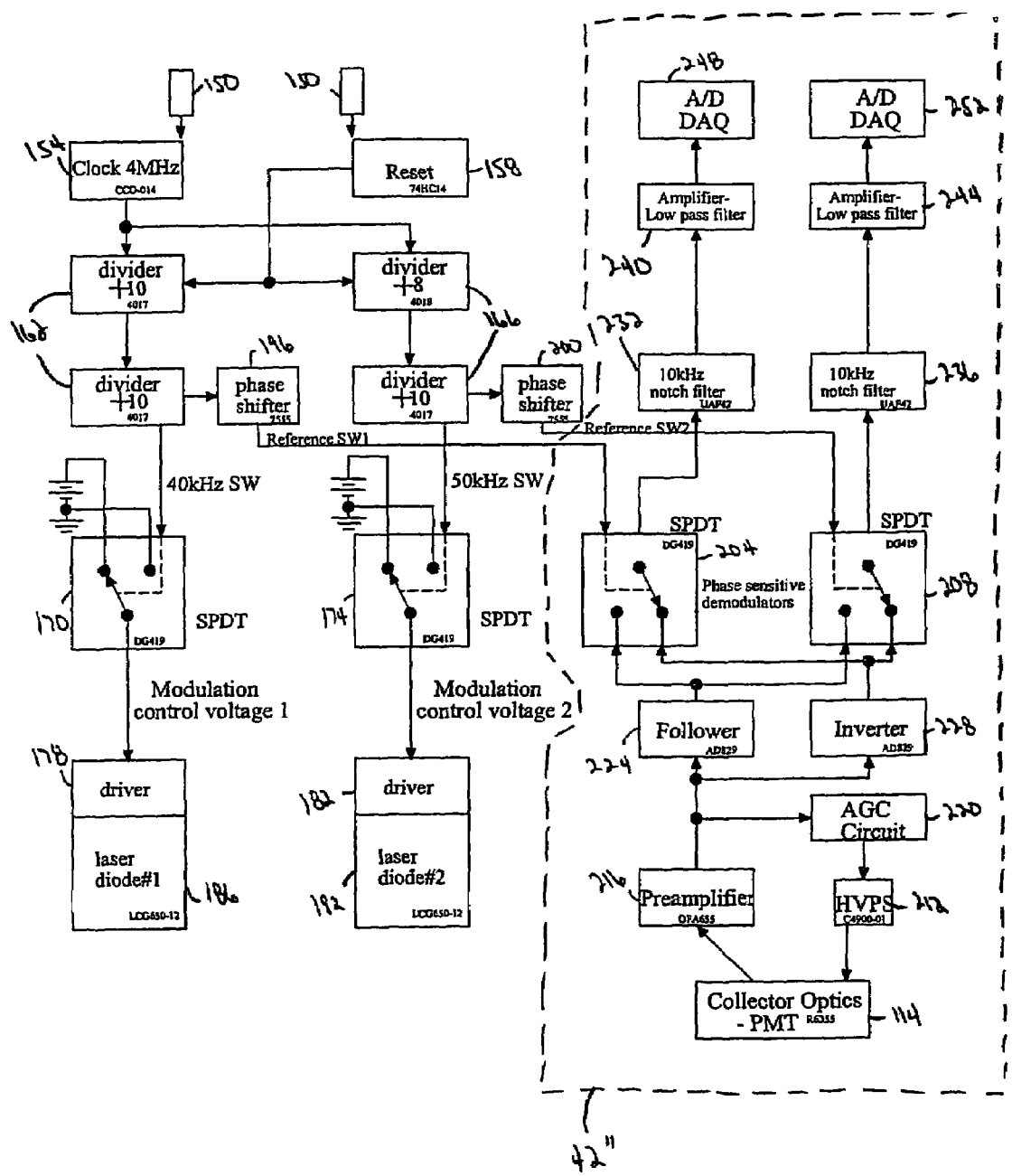
FIG. 9 is a schematic illustration of an electronic circuit diagram capable of performing the work flow shown in FIG. 8.

FIG. 9 shows an illustrative embodiment of an electronic circuit for performing the method shown in FIG. 8. The circuit is constructed primarily from CMOS logic chips. DC power 150 is applied to a crystal clock chip 154 running at 4 MHz, which provides the timing, and a reset function 158 is generated by a Schmitt Trigger circuit. The clock 154 drives two divider sequences 162 (÷100) and 166 (÷80), to generate two square wave digital logic signals running at 40 kHz and 50 kHz, respectively. These digital logic signals control electronic SPDT switches 170 and 174 that provide the modulation voltage required by the laser driver circuits 178 and 182. Thus, the outputs of laser diodes 186 and 192 are modulated with approximately square waveforms, the first 186 at 40 kHz and the second 192 at 50 kHz. The digital logic signals from the two divider sequences 158 and 162 are also inputted into phase shifting circuits 196 and 200 to provide reference square waves to PSD circuits 204 and 208.

The detector section 42" includes a PMT 114 driven by a battery operated, high voltage power supply 212. The output of the PMT 114 feeds a transimpedance amplifier 216 including an operational amplifier chip. The time constant of the circuit may be less than 0.1 µs. Thus, the output of the amplifier primarily includes resolvable photon derived pulses until the PMT approaches saturation. The output of the preamplifier 216 feeds an automatic gain control circuit 220 that reduces the PMT voltage whenever the signal gets large enough to saturate the PMT 114. In normal operation, the PMT voltage is held relatively low, for example, about 500 V, which reduces the gain significantly. Increasing the intensity of scattered radiation incident on the PMT 114 by opening up the iris 90, for example, shown in FIG. 7, can compensate for this, since the scattered radiation available is typically overabundant. The advantage of this mode of operation is that, since the PMT 114 has a maximum current rating, operating at a lower gain and higher light intensity increases the number of pulses. Since the source of noise is shot noise on these pulses, the signal to noise ratio is increased. The preamplifier 216 also drives a balanced pair of op-amps configured as a follower 224/inverter 228 pair. Their time constant is typically about 0.1 µs.

Phase sensitive detection is accomplished by switching between the direct and inverted signals by using electronic SPDT switches 204 and 208 driven by the digital reference signals from the switches' respective phase shifting circuits 196 and 200. Two channels, each corresponding to one of the modulation/reference frequencies are operated in parallel, with both being driven by the same follower 224/inverter 228 pair. Following phase sensitive detection, the signals pass through 10 kHz active notch filters 232 and 236, which remove the beat frequency between channels. For example, for modulation frequencies of 40 kHz and 50 kHz, the beat frequency is the difference between the two modulation frequencies. The signals then pass through low pass filter amplifiers 240 and 244, and the signals are digitized by A/D digital acquisition cards 248 and 252 for analysis by a computer. The final low pass filter time constants are chosen to insure that there is no aliasing in the subsequent A/D conversion step.

There are numerous applications in which it is desirable to measure the velocity of particle motion, particularly when the particles are contained in a transparent medium that is moving. If the particles are small enough, they will be entrained with the medium and a measurement of their velocity becomes equivalent to a measurement of the velocity of the medium itself. In many cases, the particles are naturally present, but in other cases it is necessary and desirable to seed the medium with probe particles whose properties are better defined. There are many situations, particularly in the measurement of the motion of fluids outside of the laboratory, such as flow of streams and seawater, the atmosphere, fluids in pipelines, for example, oil or natural gas, where seeding is impractical. In such instances, naturally occurring particles, such as sediment or air bubbles, are used.

In an embodiment where sediment is measured in seawater, a submersible unit is constructed that houses the sources of radiation and the detector assembly. Cables may be used to connect the submersible unit to the surface of the seawater. Preferably, the electronic circuit is used and is located in close proximity to the sources and detector. In such an embodiment, the observation region is located in the seawater about 300 mm beyond the final window of the submersible unit. The visible portion of the beams is about 20 mm long, and over this distance, the beams are essentially parallel, separated by about 2 mm, and of an approximately constant cross-section of about 0.2 mm×8 mm. The light from the sources is highly polarized along the axis normal to the plane of the beams. This optimizes the amount of light reflected by the final prism, and insures that there is a high degree of polarization perpendicular to the optical axis of the detector.

Figure 10:
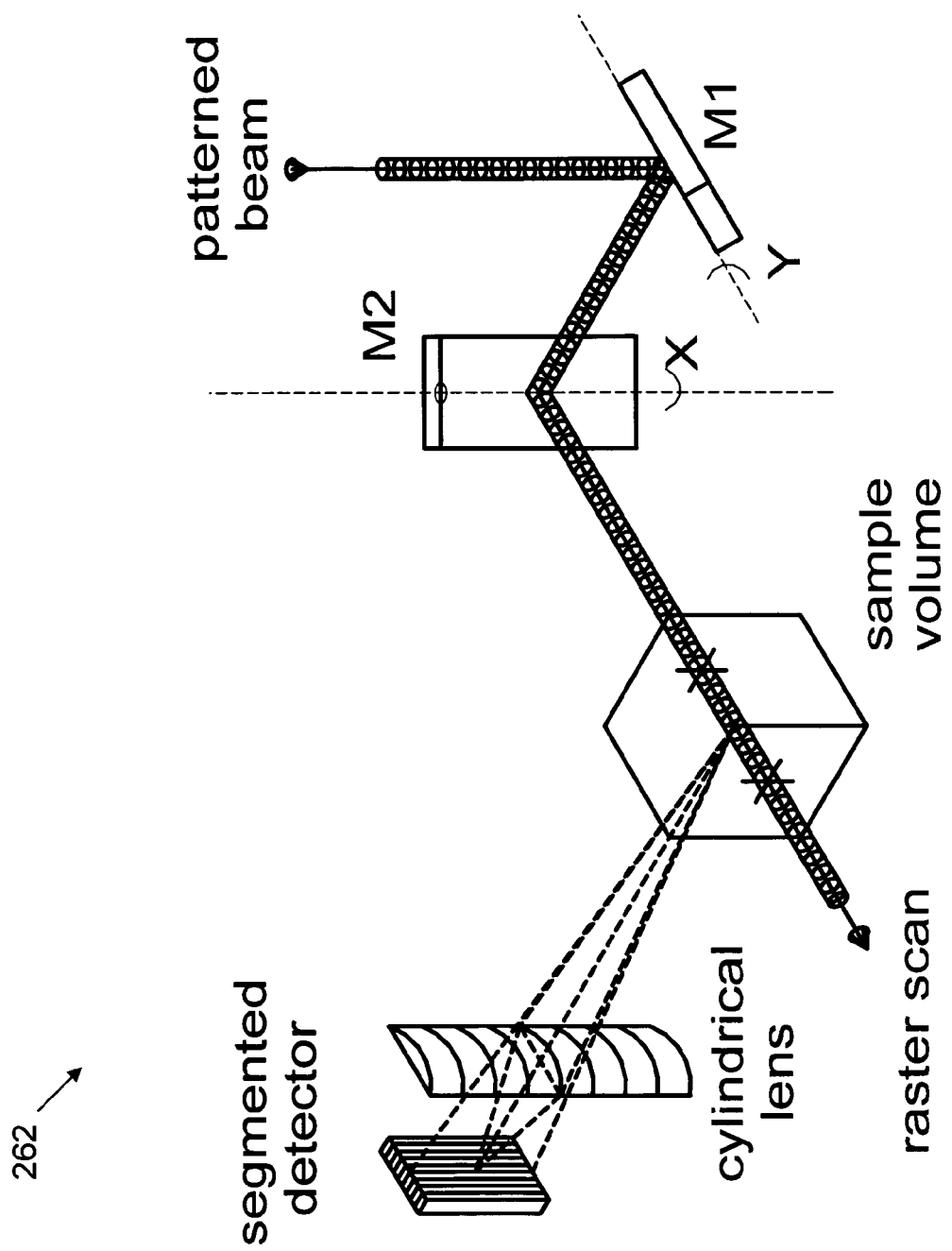
FIG. 10 is a schematic illustration of an embodiment of an apparatus for measuring particle motion using a moving patterned beam according to the invention.
Figure 11:
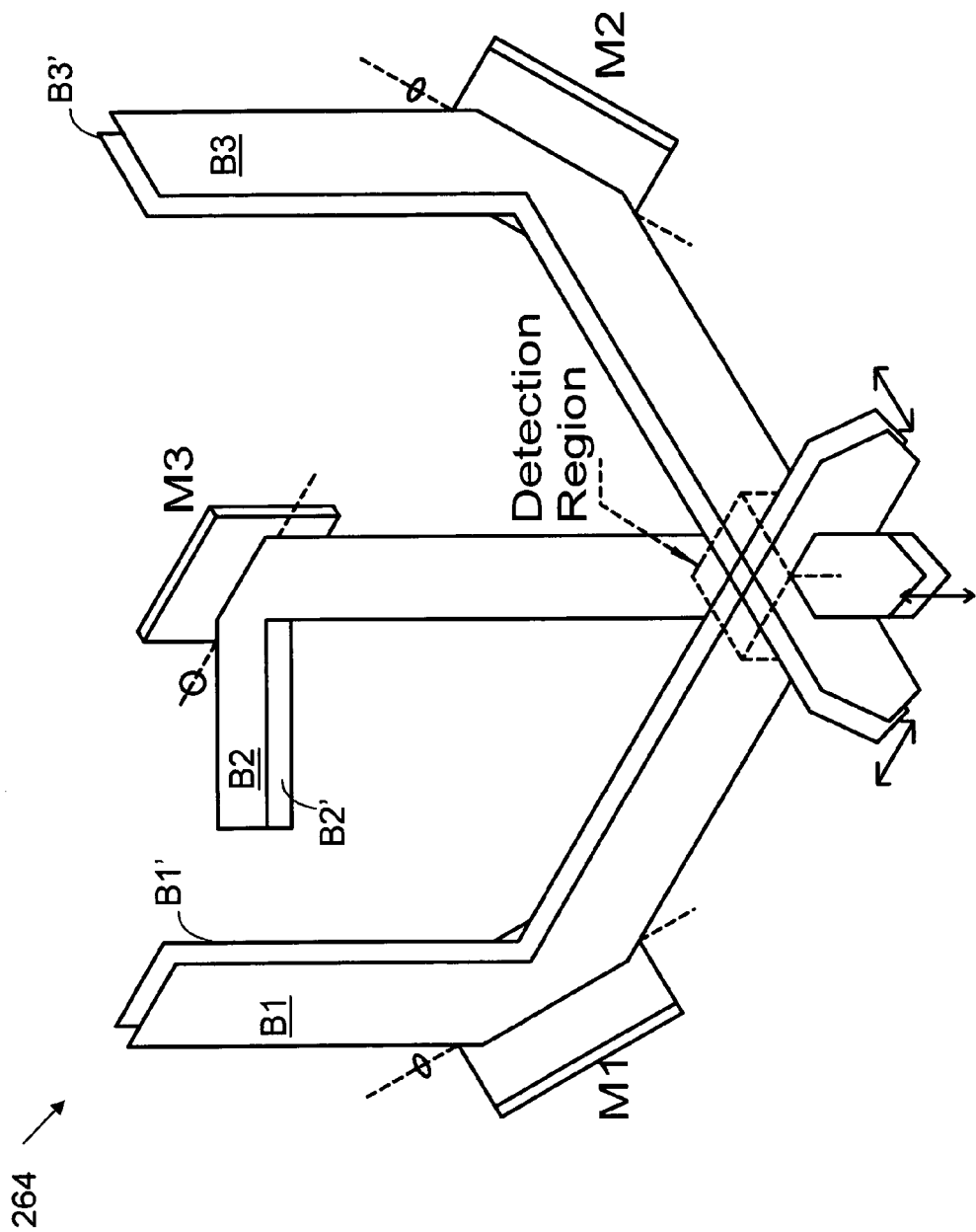
FIG. 11 is a schematic illustration of an embodiment of an apparatus for measuring particle motion using multiple intersecting moving beams according to the invention.

FIGS. 10 and 11 show two apparatus 262, 264, respectively, for measuring particle motion by moving or otherwise translating a plurality of beams or a particular beam pattern. Moving the beam pattern from one region of space to another facilitates the measurement of particle velocity at several adjacent points, within a time span over which the velocity field does not change significantly at a point. The actual rate of change of the velocity field is determined by the particular flow configuration. Typically, the usefulness of any measurement is determined by its reproducibility within a particular level of tolerance for variation. As a result, one can measure not only the value of the velocity field at a particular point in space, but also its vector derivatives such as components of its divergence and curl at that point. In addition, this approach allows various vector derivatives, such as acceleration to be evaluated at a point in space.

As shown in FIGS. 10 and 11, the motion of the beam pattern can be accomplished using a plurality of mirrors (M generally). However, moving the plurality of beams or beam patterns can be accomplished by other techniques such as light sources mounted on actuators. The apparatus 262, 264 in FIGS. 10 and 11 are suitable for measuring the velocity of particles relative to two or more beams or a particular beam pattern. Specifically, in FIG. 10 an apparatus 262 is shown for raster scanning a beam pattern through a sample volume using two moveable mirrors M1, M2. A segmented detector is paired with a cylindrical lens to receive light after interacting with particles within the sample volume. In FIG. 11, the apparatus 264 includes three beam pairs (B1, B1'; B2, B2'; and B3, B3') that are directed to a detection region using three moveable mirrors M1, M2, and M3.

Using these apparatus 262, 264, if the beam pattern is moving in the detection region or sample volume with a predetermined velocity, $v_b$, the particle velocity, $v_p$, can be determined by adding the beam velocity to the measured velocity, $v_m$.

$$v_p = v_m + v_b.$$

Therefore, in one exemplary implementation, the properties of particles that are substantially at rest are measured. Such a measurement is not possible with a stationary beam pattern, because no particles will cross any of the beam pairs, and the scattered signal will be a constant. If the pattern is moving, it is possible to use the measurement techniques disclosed herein to obtain data for particles that are at rest.

Additionally, it is possible to reduce the noise from the scattered light signal when measuring particle properties. In one embodiment, this is achieved by sweeping two parallel beams over the sample at a constant rate. Every "real" pulse that is derived from a particle crossing the first beam and not caused by electronic noise will match a second pulse derived from the same particle crossing the second beam a fixed time later. This fixed delay time either can be determined from the cross-correlation of the two signals, or calculated from the known velocity of the moving beams. Thus, the number of particles can be determined by counting only pulses that appear on both signals in the proper time relationship.

If there are two channels of scattered radiation, the radiation on each will include particle-derived pulses, noise pulses, and electronic noise. If the sample is dilute, or if the detection region is small, the signals will primarily include electronic noise, with occasional pulses. In one embodiment, the process of cross-correlating these two signals includes delaying one channel by an amount $\tau$, multiplying the two channels together, and calculating the area. This can then be repeated for a slightly larger $\tau$, and so forth, to generate the area vs. $\tau$ curve. This process will produce a maximum when the particle-derived pulses align.

A review of the product curve corresponding to this maximum reveals particle-derived pulses multiplying particle-derived pulses, noise pulses (usually) just multiplying electronic noise, and electronic noise multiplying electronic noise. Therefore the only large peaks will correspond to the first of these combinations. Setting a discrimination level allows for the particle-derived peaks to be counted by ignoring the smaller peaks that fall below the discrimination level.

In another embodiment, the apparatus rasters a beam pattern, either to determine a velocity pattern in some region of space, or to determine velocity derivatives. This rastering can be accomplished by the mechanisms suggested in FIGS. 10 and 11, for example, if the mirrors sweep the beam with a periodic sawtooth motion, rather than simply shifting the beam between measurements.

For instances when substantially all particles are moving with roughly the same velocity (or instances when this general assumption is applicable) the mean time-of-flight (TOF) may be determined from the location of a relatively sharp cross-correlation peak. There are times, however, when it is appropriate to arrange a configuration so that the associated TOF peak is not sharp. In particular, the TOF distribution can be used to measure some property of the particles, such as their aerodynamic size. This is possible, for example, when particles are moving at their terminal velocity through a material under the influence of a field (such as gravity or an electromagnetic field) or after they undergo a size dependent acceleration as in nozzle flow. In this case, the present method also allows for the determination of the TOF distribution from the cross-correlation function.

As an initial assumption it is useful to treat the scattered light pulses from the first beam as proportional to delta functions at the particle's $\{i\}$ arrival times $\{t_i\}$, and that the arrival times are random. A second assumption is that every particle that scatters light from the first beam also scatters the same amount of light from the second after a transit time $\{\Delta_i\}$. As a third assumption, the scattering amplitudes $\{s_i\}$ are defined as a slowly varying function of $\Delta_i$ so that $s_i = s(\Delta_i)$. Under these conditions it is possible to show that if we first subtract the mean value of each of the two scattered light signals, the cross-correlation function $R(\tau)$ of the two signals is given approximately by $$R(\tau) \approx S(\tau)n(\tau).$$

$S(\tau)$ is a slowly varying function of the transit time and is a measure of a particle's properties, and $n(\tau)$ is the desired particle TOF distribution. $S(\tau)$ is independent of the distribution of particle TOF's, and can be determined by calibration. Thus, the TOF distribution can be obtained from the cross-correlation function from the following relationship $$n(\tau) = \frac{R(\tau)}{S(\tau)}$$

where the terms on the right hand side are both measured functions.

As discussed above, scattered light has been broadly defined to include light emitted at other frequencies than the exciting light. Thus, light scattered from a particle includes fluorescent light such that the emission is proportional to the incident power. If the filter in front of the detector is arranged to pass only fluorescent light of a predefined color range, the apparatus can be sensitized to particles that only emit that color light. Thus, it is possible to only measure and/or count cells that contain a particular flurophore in a sample that has many different kinds of cells. This situation may arise naturally, as for example in blood samples, or it can be achieved by selectively bonding the particular flurophore to cells of the desired type.

One can use a segmented detector (as indicated in FIG. 10), or multiple detectors, in conjunction with this method. This can be useful whenever different physical regions can be delineated optically such as when light emitted from different regions can be imaged onto a different segment of the detector. In FIG. 10, any light emitted from a particular volume element, such as a thin elongate shell or slab, in the sample volume perpendicular to the z-direction is imaged onto a particular segment of the detector. Thus, it may be analyzed by separate circuitry at the same time that light from another volume element is being detected and analyzed with another segment of the detector.

Separate detectors may be used in other embodiments. They also can be used simply to increase the effective detector area and signal amplitude, if they are monitoring the same region but from a different direction. Finally, they can be useful to measure light emitted at different wavelengths, or with different polarizations. In this case, different filters can be placed in front of different detectors to make them sensitive to radiation of different wavelengths or polarizations.

While the invention has been particularly shown and described with reference to specific illustrative embodiments, it should be understood that various changes in form and detail may be made without departing from the spirit and scope of the invention as defined by the appended claims.

What is claimed is:

1. An apparatus for measuring particle motion, the apparatus comprising:
   a plurality of beams of radiation, each of said plurality of beams modulated at a respective, pre-determined frequency and a respective, pre-determined phase, said plurality of beams of radiation directed to at least one particle;
   a detector positioned to receive radiation scattered from each of said plurality of beams by said at least one particle; and
   a processor in electrical communication with said detector, said processor cross-correlating radiation scattered from at least two of said plurality of beams by said at least one particle,
   wherein the apparatus is configured to measure the relative velocity between the beams of radiation and the at least one particle.

2. The apparatus of claim 1, wherein said radiation scattered comprises a random component and at least one modulation frequency, the random component having at least one of its characteristic frequencies lower than the modulated frequency of any of said plurality of beams.

3. The apparatus of claim 1, further comprising a phase sensitive detection circuit in electrical communication with said detector.

4. The apparatus of claim 1, wherein said plurality of beams of radiation comprises planes of radiation.

5. The apparatus of claim 1, wherein the apparatus is configured to measure fluorescent emission.

6. The apparatus of claim 1, wherein at least one particle is a cell.

7. The apparatus of claim 1, wherein the apparatus is configured to measure pollution.

8. The apparatus of claim 1, wherein at least one of said plurality of beams of radiation is configured to traversing a detection region.

9. The apparatus of claim 1, wherein the apparatus is configured to measure velocity derivatives.

10. The apparatus of claim 1, wherein said plurality of beams of radiation form a beam pattern.

11. The apparatus of claim 10, wherein the beam pattern is configured to measure properties of particles at rest.

12. The apparatus of claim 1, wherein the detector is a segmented detector.

13. The apparatus of claim 1, wherein the apparatus is configured to measure particle velocity at a point in space.

14. The apparatus of claim 1, wherein the apparatus is configured to measure a particle selected from the group consisting of a biological particle, a cell, dust, a pollutant, a contaminant, a portion of a blood sample, a surface imperfection, and a pathogen.

15. An apparatus for measuring particle motion, the apparatus comprising:
   a plurality of beams of radiation, each of said plurality of beams modulated at a respective, pre-determined frequency and a respective, pre-determined phase, said plurality of beams of radiation directed to at least one particle;
   a detector positioned to receive radiation scattered from each of said plurality of beams by said at least one particle; and
   a processor in electrical communication with said detector, said processor cross-correlating radiation scattered from at least two of said plurality of beams by said at least one particle,
   wherein the apparatus is configured to measure a time-of-flight distribution.

16. The apparatus of claim 15, wherein the apparatus is configured to measure an aerodynamic size distribution of particles.

17. The apparatus of claim 15, wherein the apparatus is configured to measure a particle property related TOF distribution.

18. A method of measuring motion of a particle, the method comprising:
   directing radiation from a plurality of beams to at least one particle, each of said plurality of beams modulated at a respective, pre-determined frequency and a respective, pre-determined phase;
   detecting radiation scattered from each of said plurality of beams by said at least one particle; and
   cross-correlating said radiation scattered from at least two of said plurality of beams by said at least one particle to measure the motion of said at least one particle relative to the beams of radiation.

19. The method of claim 18, wherein said radiation scattered comprises a random component and at least one modulation component, the random component having at least one of its characteristic frequencies lower than the modulation frequency of any of said plurality of beams.

20. The method of claim 18, wherein said plurality of beams comprises planes of radiation.

21. The method of claim 18, wherein separation of said at least two of said plurality of beams is determined by the distance over which the velocity of said particle is substantially unchanged.

22. The method of claim 18, further comprising the step of moving at least one of the plurality of beams.

23. The method of claim 18 further comprising modulating at least one of said plurality of beams with a square wave.

24. The method of claim 23, further comprising modulating at least one of said plurality of beams at a frequency between about 20 kHz and 100 MHz.

25. The method of claim 18, further comprising modulating at least one of the plurality of beams at a frequency different from another of said plurality of beams.

26. The method of claim 18, wherein said plurality of beams comprises two orthogonal beam pairs.

27. The method of claim 18, wherein said plurality of beams comprises three orthogonal beam pairs.

28. The method of claim 18, wherein said plurality of beams comprises a plurality of non-orthogonal beam pairs.

29. The method of claim 18, further comprising calculating particle velocity.

30. The method of claim 18, further comprising calculating particle size.

31. The method of claim 18, wherein the pre-determined frequency of a first beam of the plurality of beams is substantially similar to the pre-determined frequency of a second beam of the plurality of beams, and the pre-determined phase of the first beam of the plurality of beams is substantially orthogonal to the pre-determined phase of the second beam of the plurality of beams.

32. The method of claim 18, wherein the at least one particle is contained in a fluid.

33. The method of claim 32, wherein particle velocity corresponds to velocity of said fluid.

34. An apparatus for measuring particle motion, the apparatus comprising:
- two beams of radiation, each of said beams modulated at a respective, pre-determined frequency and a respective, pre-determined phase, said beams of radiation directed on at least one particle;
- a detector positioned to receive radiation scattered from said beams by said at least one particle;
- a processor in electrical communication with said detector, said processor cross-correlating radiation scattered from said beams by said at least one particle.

35. The apparatus of claim 34, wherein said radiation scattered comprises a random component and at least one modulation frequency, the random component having at least one of its characteristic frequencies lower than the modulated frequency of any of said plurality of beams.

36. The apparatus of claim 34, wherein the at least one particle is contained in a fluid.

37. A method of measuring a plurality of particles, the method comprising the steps of:
- directing radiation from a plurality of beams to at least one particle, each of the plurality of beams modulated at a respective, pre-determined frequency and a respective, pre-determined phase;
- detecting radiation scattered from each of the plurality of beams by the at least one particle as a single signal, and extracting information associated with each of the plurality of beams from the single signal.

38. The method of claim 37 wherein the extracted information is processed using separate electrical channels.

* * * * *